United States Patent [19]

Hiller et al.

[11] 3,933,821

[45] Jan. 20, 1976

[54] DIRECT PRODUCTION OF 1,9-ANTHRAPYRIMIDINE-2-CARBOXYLIC ACID-1'-ANTHRAQUINONYLAMIDE IN PIGMENTARY FORM

[75] Inventors: Heinrich Hiller, Mannheim; Wolfgang Jentzsch, Frankenthal; Alfred Schuhmacher, Ludwigshafen, all of Germany

[73] Assignee: BASF Aktiengesellschaft, Ludwigshafen (Rhine), Germany

[22] Filed: Dec. 19, 1973

[21] Appl. No.: 426,367

[30] Foreign Application Priority Data

Jan. 2, 1973  Germany............................ 2300019

[52] U.S. Cl....................... 260/256.4 Q; 106/308
[51] Int. Cl.²........................................ C07D 239/84
[58] Field of Search............................. 260/256.4 Q

[56] References Cited
UNITED STATES PATENTS

| | | | |
|---|---|---|---|
| 2,731,464 | 1/1956 | Ebel et al..................... | 260/256.4 Q |
| 2,871,240 | 1/1959 | Randall et al................ | 260/256.4 Q |
| 3,324,131 | 6/1967 | Genta ................................ | 260/278 |
| 3,660,407 | 5/1972 | Kay et al............................ | 260/273 |
| 3,723,479 | 3/1973 | Schuhmacher ..................... | 260/273 |

FOREIGN PATENTS OR APPLICATIONS

| | | | |
|---|---|---|---|
| 1,367,834 | 7/1963 | France ......................... | 260/256.4 Q |
| 1,170,899 | 11/1969 | United Kingdom.......... | 260/256.4 Q |

*Primary Examiner*—Richard J. Gallagher
*Assistant Examiner*—David E. Wheeler
*Attorney, Agent, or Firm*—Johnston, Keil, Thompson & Shurtleff

[57] ABSTRACT

Direct production of 1,9-anthrapyrimidine-2-carboxylic acid-1'-anthraquinonylamide in pigmentary form by reaction of 1,9-anthrapyrimidine-2-carboxylic acid chloride with 1-amino-anthraquinone in a polar water-miscible aprotic solvent. The dye is obtained in a high yield and in a very finely divided and pure form. The isolated reaction product may be used direct as a pigment.

7 Claims, No Drawings

DIRECT PRODUCTION OF 1,9-ANTHRAPYRIMIDINE-2-CARBOXYLIC ACID-1, ANTHRAQUINONYLAMIDE IN PIGMENTARY FORM

The invention relates to a process for the direct production of 1,9-anthrapyrimidine-2-carboxylic acid-1'-anthraquinonylamide in a pigmentary form having particularly high tinctorial strength and improved properties for surface coating purposes.

The dye is made by the prior art method by heating 1,9-anthrapyrimidine-2-carboxylic acid, 1-aminoanthraquinone and thionyl chloride in a high boiling point solvent such as o-dichlorobenzene, nitrobenzene or trichlorobenzene at 140° to 160°C. The reaction product is separated from the mother liquor, washed with o-dichlorobenzene, stirred in methanol and then filtered. The filter cake obtained is freed from residual solvent by steam distillation and the aqueous suspension obtained is boiled with hypochlorite solution. The product purified in this way is then filtered, washed with water until neutral and dried. From this troublesome processing method the pigment is obtained in a mean particle size of from 5 to 10 microns. The consequence of this when used as a pigment is a moderate pigmenting strength and inferior gloss properties in coatings which contain these pigments.

It is an object of the present invention to provide a process which it is easy to handle industrially according to which the dye is obtained direct in an advantageous pigmentary form having high tinctorial strength.

We have found that a finely divided 1,9-anthrapyrimidine-2-carboxylic acid-1'anthraquinonylamide is obtained direct in pigmentary form by condensing the anthrapyrimidine carboxylic acid chloride with the 1-aminoanthraquinone in a polar, water-miscible, aprotic solvent.

A very finely divided 1,9-anthrapyrimidine-2-carboxylic acid-1'-anthraquinonylamide is obtained according to the process; it has a mean particle size of about 1 micron and has a tinctorial strength which is from about 50 to 70% higher than that of the pigment which has been prepared by the prior art method.

The process according to the invention is carried out generally by introducing the starting materials (1,9-anthrapyrimidine-2-carboxylic acid chloride and 1-aminoanthraquinone) into the polar aprotic water-miscible solvent and heating the mixture slowly to the desired reaction temperature.

Condensation takes place under mild conditions and as a rule begins at room temperature. The reaction mixture is generally heated to a temperature of from 40° to 140°C and preferably to a temperature of from 70° to 100°C. At these temperatures the condensation is generally completed after from 1 hour to 3 hours.

The amount of water-miscible aprotic solvent is determined by the requirement that the reaction mixture should remain stirrable before, during and after the reaction. It is convenient to use from 5 to 25 times and preferably from 10 to 20 times the amount of solvent in relation to the anthrapyrimidine carboxylic acid chloride used. The use of larger amounts of solvent does not add any advantage but has no disadvantages. Suitable water-miscible polar aprotic solvents include: N,N-dialkylamide of aliphatic carboxylic acids with a total of 3 to 8 carbon atoms or N-alkyl-lactams such as N,N-dimethylformamide, N,N-diethylformamide, N,N-dimethylacetamide, N,N-diethylacetamide, N,N-dimethylpropionamide, N,N-diethylpropionamide, N-methylpyrrolidone, N-methylcaprolactam or mixtures of the same. N,N-dimethylformamide, N,N-dimethylacetamide, N-methylpyrrolidone and mixtures of the same are preferred for the sake of economy and of these N-methylpyrrolidone is especially preferred because of the rapid reaction and the particularly advantageous tinctorial properties of the product. A particularly rapid reaction of the acid chloride is obtained with the 1-amino-anthraquinone when the condensation reaction is carried out in the presence of a tertiary amine as proton acceptor or of an agent which removes by a chemical reaction the hydrogen chloride liberated in the condensation. Examples of tertiary amines suitable for the said purpose are triethylamine, tripropylamine and tributylamine.

Tertiary alcohols such as tertiary-butanol are particularly suitable as agents which undergo a chemical reaction with the hydrogen chloride formed.

The tertiary amine or the agent which will react with hydrogen chloride formed in the reaction is generally used in an equivalent amount with respect to the acid chloride used. More or less than the said amount of the agent is however not disadvantageous. Another preferred variant of the process of the invention consists in preparing the 1,9-anthrapyrimidine-2-carboxylic acid chloride required as starting compound from the corresponding anthrapyrimidine carboxylic acid in the condensation medium immediately prior to the condensation by reaction with a chlorinating agent. Thionyl chloride, phosphorus oxychloride or phosgene are particularly suitable as chlorinating agents. Chlorination takes place in the strongly polar aprotic solvent at ambient temperature to 40°C without additional heating.

This variant of the process is particularly preferred for use on an industrial scale because isolation of the anthrapyrimidine carboxylic acid chloride (in which some of the acid chloride is hydrolyzed again) is not necessary.

The reaction mixture is processed by conventional methods. After the condensation is over the deposited pigment is filtered off and the filter residue advantageously stirred with the same solvent and the pigment again separated, for example by filtration, centrifuging or decantation. The filter residue is then washed with water and optionally dried.

The product occurs in the form of fine needles having a mean particle size of about 1 micron. It has a color strength which is 50 to 70% higher than that of the pigment prepared by the prior art methods. After it has been incorporated into a surface coating material it imparts thereto a noticeably higher gloss than the pigment obtained by a prior art method. This result is surprising because it would have been expected because of the high dissolving power of the strongly polar aprotic solvent that the finely divided pigment precipitated during the condensation would crystallize to large particles under the reaction conditions.

The Examples will further illustrate the process of the invention. The parts and percentages given are by weight unless otherwise stated.

EXAMPLE 1

125 parts of 1,9-anthrapyrimidine-2-carboxylic acid is stirred in 2000 parts of N-methylpyrrolidone (NMP). Thionyl chloride is added at 25° to 30°C while cooling so that the carboxylic acid passes into solution with the formation of the acid chloride. 99 parts of 1-aminoanthraquinone and 88 parts of tertiary-butanol (to bind hydrogen chloride formed) are then added. Formation of the dye with a weakly exothermic reaction begins at ambient temperature. The reaction mixture is slowly heated to 90° to 110°C and stirred for 2 hours at this temperature. After the dye suspension has been filtered the filter cake is stirred in 2000 parts of NMP, filtered and then washed with water and dried.

The yield is 200 parts of 1,9-anthrapyrimidine-2-carboxylic acid-1'-anthraquinonylamide, equivalent to 93% of theory.

EXAMPLE 2

125 parts of 1,9-anthrapyrimidine-2-carboxylic acid is stirred into 2000 parts of NMP. 60 parts of phosgene is passed in as gas at 25° to 30°C so that a solution of the carboxylic acid chloride is formed.

99 parts of 1-aminoanthraquinone and 88 parts of tertiary-butanol are added and the whole is further processed as described in Example 1.

The yield is 200 parts of 1,9-anthrapyrimidine-2-carboxylic acid-1'-anthraquinonylamide, equivalent to 93% of theory.

EXAMPLE 3

35 parts of 1,9-anthrapyrimidine-2-carboxylic acid is stirred into 700 parts of NMP. 20 parts of thionyl chloride is added at 25°C while cooling so that the carboxylic acid passes into solution with the formation of the acid chloride. 28 parts of 1-aminoanthraquinone and 24 parts of tertiary-butanol are added and the reaction mixture is heated to 40°C. After stirring for 3½ hours at this temperature the dye suspsnsion is filtered, the filter residue is stirred into 600 parts of NMP, the suspension is filtered and the filter cake is washed with water and dried.

The yield is 57 parts of 1,9-anthrapyrimidine-2-carboxylic acid-1'-anthraquinonylamide, equivalent to 93.5% of theory.

EXAMPLE 4

35 parts of 1,9-anthrapyrimidine-2-carboxylic acid and 20 parts of thionyl chloride are reacted to the acid chloride in 700 parts of NMP as described in Example 3. 28 parts of 1-aminoanthraquinone and 24 parts of tertiary-butanol are added and the reaction mixture is heated to 80°C. After stirring for two hours at this temperature the whole is worked up as described in Example 3.

The yield is 60.5 parts of 1,9-anthrapyrimidine-2-carboxylic acid-1'-anthraquinonylamide, equivalent to 99% of the theory.

EXAMPLE 5

The procedure of Example 4 is repeated but at 120°C. The yield is 56.5 parts of the anthraquinonylamide, equivalent to 92.5% of theory.

EXAMPLE 6

Example 4 is repeated but the reaction is carried out at 140°C. The yield is 56.1 parts of the anthraquinonylamide, equivalent to 92% of theory.

EXAMPLE 7

35 parts of 1,9-anthrapyrimidine-2-carboxylic acid is stirred into 700 parts of NMP. While cooling 20 parts of thionyl chloride is added at 25°C so that the carboxylic acid passes into solution with the formation of the acid chloride. 500 parts of NMP is then distilled off in vacuo at 35° to 40°C. the distillation residue is cooled to 0°C and the acid chloride which crystallizes out is filtered off. The filter cake is dissolved in 600 parts of NMP, 28 parts of 1-aminoanthraquinone and 5 parts of triethylamine are added and the whole is heated to 80°C. The dye suspension is filtered and the filter cake is stirred into 500 parts of NMP, the suspension is filtered and the filter residue is washed with water and if desired dried.

The yield is 50 parts of 1,9-anthrapyrimidine-1-carboxylic acid-1'-anthraquinonylamide, equivalent to 82% of theory.

We claim:

1. A process for the direct production of 1,9-anthrapyrimidine-2-carboxylic acid-1'-anthraquinonylamide in pigmentary form which comprises the step of condensing 1,9-anthrapyrimidinecarboxylic acid chloride with 1-aminoanthraquinone in N-methylpyrrolidone.

2. A process as set forth in claim 1 wherein the reaction is carried out in the presence of triethylamine, tripropylamine or tributylamine at a temperature of from 40° to 140°C.

3. A process as set forth in claim 1 wherein the reaction is carried out at a temperature of from 40° to 140°C and in the presence of tertiary butanol as the agent which will react with hydrogen chloride formed in the reaction.

4. A process as set forth in claim 1 wherein the reaction is carried out at from 40° to 140°C.

5. A process as set forth in claim 1 wherein triethylamine, tripropylamine or tributylamine is used as the proton acceptor.

6. A process as set forth in claim 1 wherein tertiary-butanol is used as the agent which will react with hydrogen chloride formed in the reaction.

7. A process as set forth in claim 1 wherein the 1,9-anthrapyrimidine-2-carboxylic acid chloride required as starting material is prepared in the polar water-miscible aprotic solvent immediately prior to the condensation.

* * * * *